Nov. 4, 1969  R. PIRLET  3,475,859

DEVICE FOR OBSERVING THE CONTENTS OF AN ENCLOSURE

Filed Nov. 17, 1967  3 Sheets-Sheet 1

INVENTOR
ROBERT PIRLET
BY
ATTORNEYS

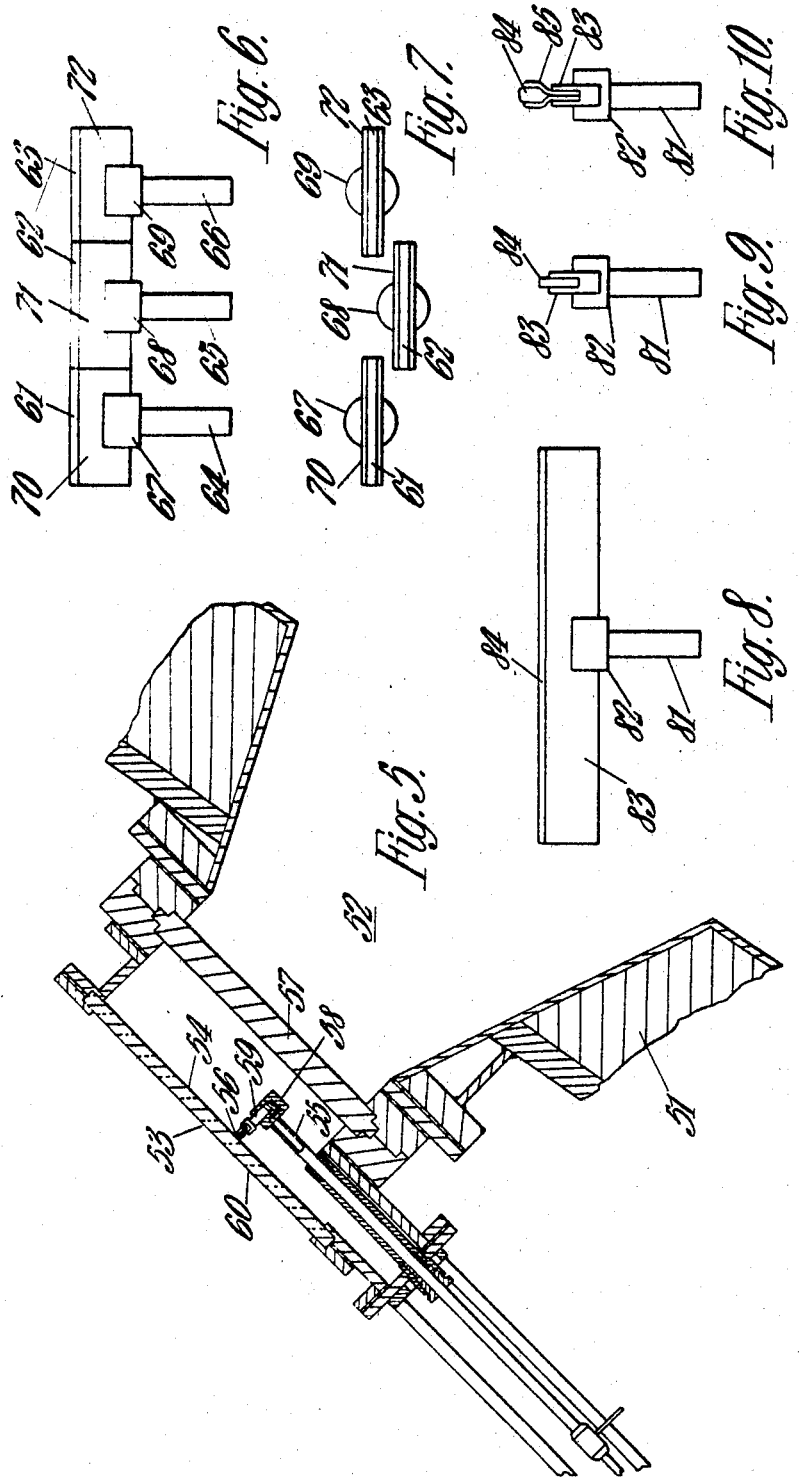

United States Patent Office 3,475,859
Patented Nov. 4, 1969

3,475,859
DEVICE FOR OBSERVING THE CONTENTS OF AN ENCLOSURE
Robert Pirlet, Angleur, Belgium, assignor to Centre National de Recherches Metallurgiques, Montoyer, Brussels, Belgium, a Belgian body corporate
Filed Nov. 17, 1967, Ser. No. 684,004
Claims priority, application Belgium, Nov. 24, 1966, 52,435; Dec. 6, 1966, 690,787
Int. Cl. E06b 7/00, 7/12
U.S. Cl. 49—70      8 Claims

ABSTRACT OF THE DISCLOSURE

A device for observing the contents of an enclosure, comprising an observation screen or screens, each co-ordinated with a shutter valve arranged around the observation opening on the wall of the enclosure and operated by a screw system, and with a cleaning device consisting of one or more scrapers displaceable rectilinearly and rotarily by a fluid pressure system whose pressure is kept higher than in the enclosure and variable as a function of the speed of displacement of the scraper or scrapers.

---

Figure 1:
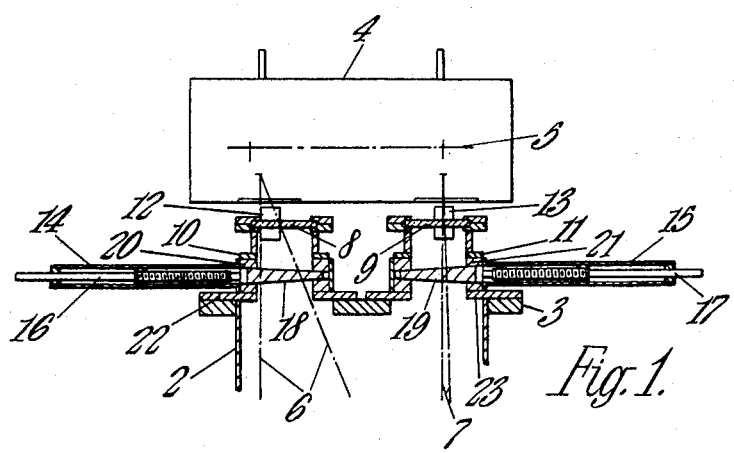

The present invention relates to a device for observing the contents of an enclosure, which is of particular use in carrying out observations and/or measurements to check on a process in progress within an enclosure, and specifically within an enclosure for which suitable observation screens must be employed on the grounds of pressure and/or temperature and/or composition of gases and/or dust content of the atmosphere.

It is known that an observation screen, such as a so-called "bull's eye," may be arranged to seal an opening formed in the side of a blast furnace, a heat treatment furnace, or in general of an enclosure within which a process is carried out. This screen is intended to allow observations and measurements to be carried out, whilst isolating the inside of the enclosure from the observation and measuring instruments which are thus separated and protected from the frequently corrosive atmosphere present within the said enclosure.

The difficulty resides in constructing a port-hole of sufficient tightness, of minimum bulk, such as to allow observations to be performed in the most efficient manner, and on which different operations such as maintenance work, may be performed without affecting the progress of the process within the enclosure.

The device forming the subject of the present invention comprises at least one observation screen, such as a bull's eye for example, equipped with a cleaning device and situated outside a shutter valve or the like, the latter being fastened on the wall of the enclosure, around the opening intended for observation purposes. The line of sight passes, in sequence, through the screen, the valve—after retraction of the shutter, and the opening in question, to reach the charge.

According to the invention, the device includes means for cleaning the inner surface of the screen the said cleaning means comprising a scraper and means for moving the scraper across the inner surface of the screen, a cylinder block movable across the screen with the scraper and including a fluid cavity, a plunger in the said cavity, said scraper being mounted on the plunger for movement towards and away from the screen, and passages for supplying pressurised fluid to the fluid cavity to urge the plunger and scraper towards the screen.

The provision of a cleaning device for the screen improves the conditions in which the operations are performed, and the plunger and scraper being urged towards the screen ensures that they are maintained in contact therewith so as to provide an effective cleaning action.

The opening in the wall of the enclosure and through which observations may be carried out, may be sealed off in hermetic manner, by the said shutter valve. Once this valve has been closed, any operations considered to be appropriate may be performed on the observation device, for example, cleaning, servicing, repairs, removal, modifications and others, without the need to interrupt the process in progress within the enclosure. Another advantage of the device according to the invention resides in the small bulk of the said valve, along the plane of its shutter and in particular along the direction at right angles to this plane.

The particularly small axial bulk, it is possible to ensure with a valve of this kind, renders it possible to position the observation apparatus substantially closer to the opening in the wall of the enclosure, and all other conditions being identical, to increase the field of view appreciably. Alternatively, the size of the opening may be reduced for the same angle of true vision.

Devices according to the invention, and particularly contrived for observation by telemetry of the upper surface of the charge in a blast furnace, is illustrated by way of example in the accompanying drawings.

Figure 2:
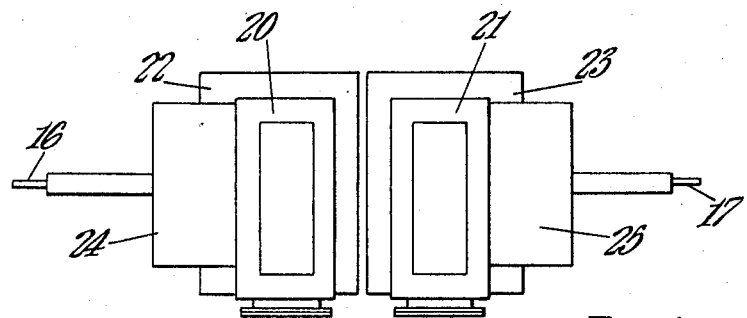
Figure 3:
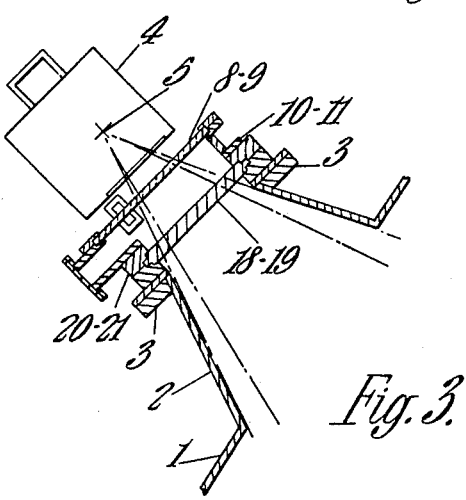
Figure 4:
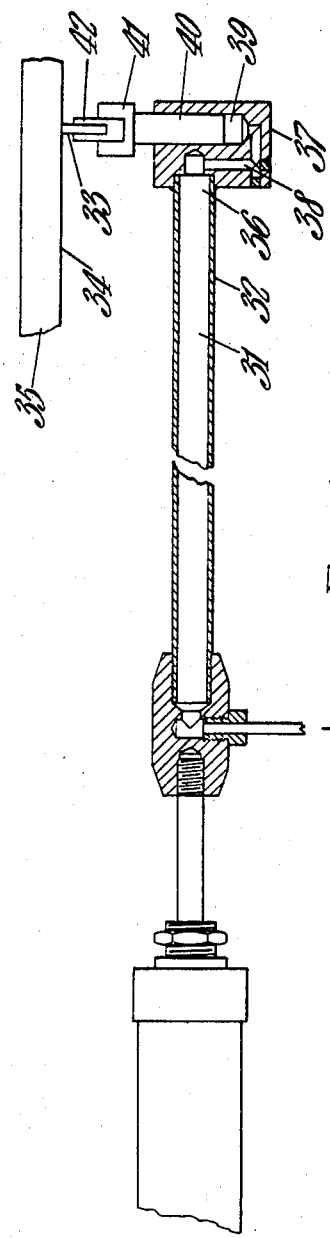

In the drawings:
FIGURE 1 shows a diagrammatic elevation of one form of the invention;
FIGURE 2 is a plan view of the device of FIGURE 1;
FIGURE 3 is a side elevation of the device of FIGURES 1 and 2;
FIGURE 4 illustrates the details of the device which renders it possible to ensure a permanent contact between the scraper or wiper and the surface which is to be cleaned;
FIGURE 5 illustrates an overall view of the device in the operating position on the wall of a blast furnace;
FIGURES 6 and 7 illustrate the particular arrangement of a scraper or wiper comprising three non-aligned rectilinear parts; and
FIGURES 8, 9 and 10 show types of scrapers or wipers for cleaning a device according to the invention.

Referring first to FIGURES 1 to 3, the wall of a blast furnace is shown at 1, the device as a whole being fastened on a flange 3 which is solid with the boss 2 connected to the wall. A telemetric observation instrument 4 is arranged to turn about an axis 5, the lines of sight being 6 and 7.

The device according to the invention essentially comprises:
Two observation windows 8 and 9 attached to corresponding flanges 10 and 11 and equipped with corresponding wipers 12 and 13,
Two sealing shutter valves 14 and 15 comprising control rods 16 and 17 operated by a screw system, shutters 18 and 19, and valve seats 20 and 21 at the telemeter side and 22, 23 at the blast furnace side. Hermetic shutter chests are shown at 24 and 25.

FIGURE 3 in obvious manner demonstrates the favourable result of the small bulk of the valve, in respect of the useful angle of view available to the telemeter.

The cleaning device of the port-hole assembly according to the present invention is advantageously arranged in such manner that the scraper or wiper is kept in permanent contact with the surface of the screen facing towards the inside of the enclosure, by means of a fluid under pressure.

This cleaning device comprises an element arranged to slide within a cavity within a fluid compartment, one of the extremities of the said sliding element being equipped with a scrapper or wiper and the other extremity being intended to be acted upon by the fluid present in the cavity in the said chamber, this chamber being solid with the member performing the displacement of the scraper or wiper on the surface which is to be cleaned, the said member possessing an internal passage intended to ensure communication between the source of pressure and the fluid chamber, the said fluid chamber having a duct or passage intended to ensure communication between the internal passage of the said member and the cavity for pressurising the sliding element solid with the scraper or wiper.

According to a particularly advantageous form of embodiment of the invention, the scraper or wiper comprises at least two parts, each of these parts being solid with one sliding element, as in the case of a scraper or wiper made in one piece, the fluid chamber being common to the different parts and on the one hand comprising a number of cavities corresponding to that of the component parts of the scraper or wiper, and on the other hand appropriate ducts of the scraper or wiper, and on the other hand appropriate ducts or passages for connection to the source of pressure.

The said member operating the displacement of the scraper or wiper is advantageously equipped with a mechanism for rotation about its own axis.

The scraper or wiper may consist of a pliable or resilient material, either by composition as in the case of asbestos, rubber, and the like, or by method of production, as in the case of a pad of intermeshed fibres, these fibres being for example metal, textile or synthetic fibres.

In the case in which pressure and high temperature are applied within the enclosure carrying the surface which is to be cleaned, the scraper or wiper, the sliding element, the fluid chamber and the member operating the displacement of the scraper or wiper on the said surface, are advantageously made of heat-resistant materials. In particular, the scraper or wiper may be produced from a material analogous to brake lining, from rubber exposed to appropriate heat treatment, and the like.

FIGURES 4 to 10 illustrate details of the cleaning devices.

According to FIGURE 4, compressed air enters through a central passage 31 of a tube 32 which carries a scraper or wiper 33 across the surface 34 of the observation screen 35. This compressed air passes at 36 into an air distribution box 37 which it traverses through the passages 38 to reach a cylinder 39 in which it exerts thrust on a piston 40. By this action, the piston 10 having a shoulder 41 solid with a scraper support 42, holds the said scraper 33 in permanent contact with the surface 34. To make up for wear of the scraper 33 and for unevenness of the surface 34, the tube 32 may be arranged to perform a rotary motion, which renders it possible to vary the inclination of the scraper relative to the surface to be cleaned. A small amount of air leakage is unavoidable between the side of the cylinder 39 and the sliding surface of the piston 40, but by applying the safeguard of maintaining a higher pressure within the air distribution box than that prevailing within the blast furnace enclosure, penetration of dust into the cylinder 39 is prevented, reducing the danger of seizure of the piston 40.

In FIGURE 5, the wall 51 of the blast furnace has an opening 52 separated from the outside by an observation screen 53. Between the opening 52 and the observation screen 53 is situated a shutter valve 57 arranged so that the enclosure may be sealed off and that the screens, cleaning elements and others may be replaced without affecting the evolution of the process in progress within the enclosure.

The device for cleaning the observation screen 53 is shown with its member 55 for displacement of the scraper 56 along the inward surface 54 of the screen 53 and with an air distribution box 58 and a piston 59. If the outer surface 60 of the screen 53 should need to be cleaned, it is possible to apply a method analogous to that of the invention, or a system for blowing air over the surface 60 itself.

According to FIGURES 6 and 7, the scraper comprises three rectilinear parts 61, 62 and 63, of which two, being 61 and 63 may be situated in alignment with each other, whereas the part 62 parallel to the other two, is set back. The three parts are of identical length, but it is to be noted that the distance separating the two parts 61 and 63 is shorter than the length of the part 62, so that the cleaning action cannot miss any area. It is evidently possible to contemplate many different forms of a scraper of this nature, either in respect of the arrangement of the different parts relative to each other, of their length, shape, number, and the like, without thereby exceeding the scope of the present invention. FIGURE 6 moreover illustrates the three pistons 64, 65 and 66, each possessing a corresponding shoulder 67, 68, 69, and a corresponding bearer 70, 71 and 72 for the scrapers, intended to ensure permanent contact between the scrapers 1, 2, and 3 and the surface to be cleaned.

FIGURES 8 and 9 show a cleaning device according to the invention, this device being formed by a single piece. Therein may easily be recognised the piston 81 and its shoulder 82, a bearer 83 and a scraper 84, which may be made of pliable or resilient material such as asbestos, rubber and the like, as already set forth above.

FIGURE 10 is identical with FIGURE 9, except for the scraper 84 whose resilient characteristic is ensured by its structure, being a pad of intermingled metal fibres for example, and which is held by an additional component 85 in the form of a clamp or the like, owing to this fact.

The present invention equally covers an advantageous method for application of the cleaning device, in which the pressure of the fluid, which may be a gaseous fluid, is varied as a function of the speed of displacement of the scraper on the surface to be cleaned. This variation occurs in the sense of an increase in pressure for a reduction in speed, which enhances the quality of the contact between the scraper and the surface.

According to another application of the invention, the said scraper equally has imparted to it a rotary motion about its axis of displacement on the surface to be cleaned, and/or about an axis parallel to its axis of displacement, which in particular renders it possible to maintain permanent contact between the scaper and the said surface in case of wear of the said scraper and/or of a deformation of the said surface.

In this text, the term "axis of displacement" may be applied in respect of any optional trajectory of the scraper on the surface to be cleaned, this trajectory being liable to be rectilinear, curvilinear or to assume any arbitrary outline.

In the case in which the surface to be cleaned forms part of an enclosure in which a specific pressure prevails, it is advantageous to maintain the pressure of the fluid acting on the scraper at a higher value than that of the internal pressure of the said enclosure.

I claim:

1. In a device for observing the contents of an enclosure through an observation aperture, and comprising at least one shutter valve arranged to seal the observation aperture, a sealed observation screen arranged outside the shutter valve whereby the contents of the enclosure may be viewed through the screen and aperture when the valve is open, the screen having an inner surface adapted to be exposed to the atmosphere in the enclosure where the shutter valve is open: the improvement that the device includes means for cleaning the inner surface of the screen, the said cleaning means comprising a scraper and means for moving the scraper across the inner surface of the screen, a cylinder block movable across the screen with the scraper and including a fluid cavity, a plunger in the said cavity, said scraper being mounted on the plunger for movement towards and away from the screen, and passages for supplying pressurised fluid to the fluid cavity to urge the plunger and scraper towards the screen.

2. A device as claimed in claim 1, comprising a pair of observation screens, each of which is situated above an individual shutter valve or the like.

3. A device as claimed in claim 1, wherein the scraper comprises at least two separate scraping elements each mounted on a support plunger located in an individual fluid cavity in the cylinder block and adapted to be simultaneously pressurised through the said passages.

4. A device as claimed in claim 1, in which the means for moving the scraper is provided with means for rotation about its axis.

5. A device as claimed in claim 1, in which the scraper comprises a resilient pad of fibres.

6. A device as claimed in claim 1, in which the pressure of the fluid in the cavity is variable as a function of the speed of displacement of the scraper over the inner surface of the screen.

7. A device as claimed in claim 1, in which the pressure of the fluid in the cavity is maintained at a value higher than that of the pressure inside the enclosure to prevent leakage from the enclosure to the cavity.

8. A device as claimed in claim 1, when mounted on a blast furnace for observing the operation therein.

References Cited

UNITED STATES PATENTS

| | | | |
|---|---|---|---|
| 427,896 | 5/1890 | O'Toole | 52—171 X |
| 518,057 | 4/1894 | Farnum | 126—200 |
| 1,349,562 | 8/1920 | Curry | 126—200 |
| 1,604,811 | 10/1926 | Curry et al. | 126—200 |
| 3,154,821 | 11/1964 | Weker | 52—168 |

FOREIGN PATENTS 542,906   7/1957   Canada.

DENNIS L. TAYLOR, Primary Examiner

U.S. Cl. X.R.

15—250.29